Nov. 14, 1950 — F. C. FANTZ — 2,530,295

SWINGING SLIDE VALVE

Filed Aug. 22, 1945 — 2 Sheets-Sheet 1

Inventor:
Fred C. Fantz,
By Clinton, Wilzschroeder, Merriam & Hofgren, Attys.

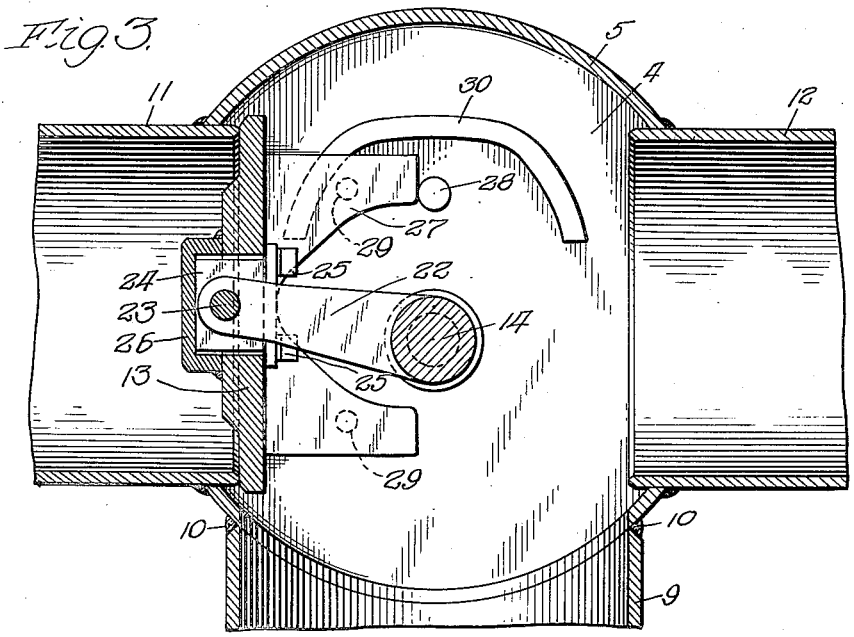
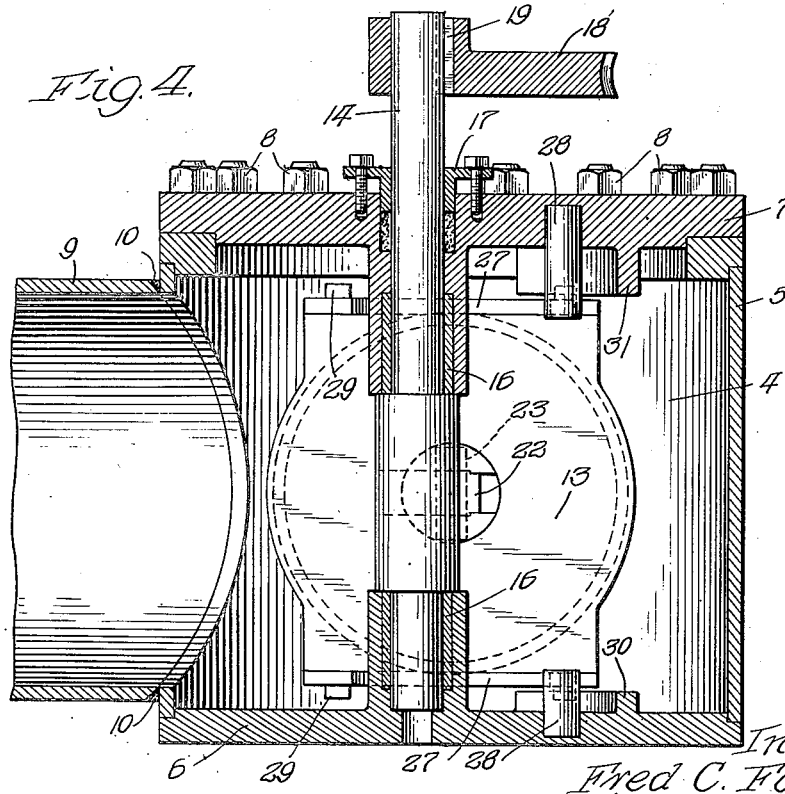

Patented Nov. 14, 1950

2,530,295

UNITED STATES PATENT OFFICE 2,530,295

SWINGING SLIDE VALVE

Fred C. Fantz, Logan Township, Auglaize County, Ohio, assignor to Henry Pratt Company, a corporation of Illinois Application August 22, 1945, Serial No. 611,973

9 Claims. (Cl. 251—13)

This invention relates to large valves, of the type used in water mains, and the like, and more particularly to an improved valve having a head which swings into the plane of the valve seat and then slides into tight engagement therewith.

The primary object of the invention is to provide an improved high pressure valve, which can be made largely of welded steel parts and will operate easily to open one conduit to a valve chamber and subsequently close another conduit.

Another object of the invention is to provide an improved swinging slide valve, wherein the valve head is pivotally mounted on the end of an operating crank arm, wherein the center of the crank arm is offset from the perpendicular center line of the valve seat, so that considerable pressure can be exerted in seating the valve head, and wear on the faces of the valve head or seat will not prevent the valve from closing properly.

Another object of the invention is to provide an improved valve, wherein the valve head may be turned from one valve seat to another, and guide members are provided on the walls of the chamber and on the valve head to direct it from the plane of one seat into the plane of the other.

The invention is illustrated in a preferred embodiment in the accompanying drawings, in which—

Figure 1:
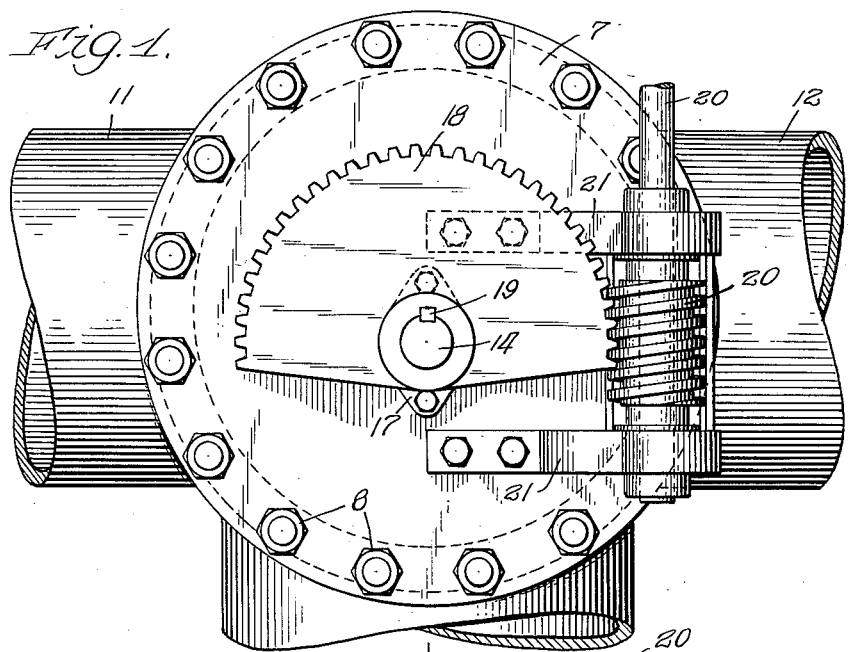
Figure 2:
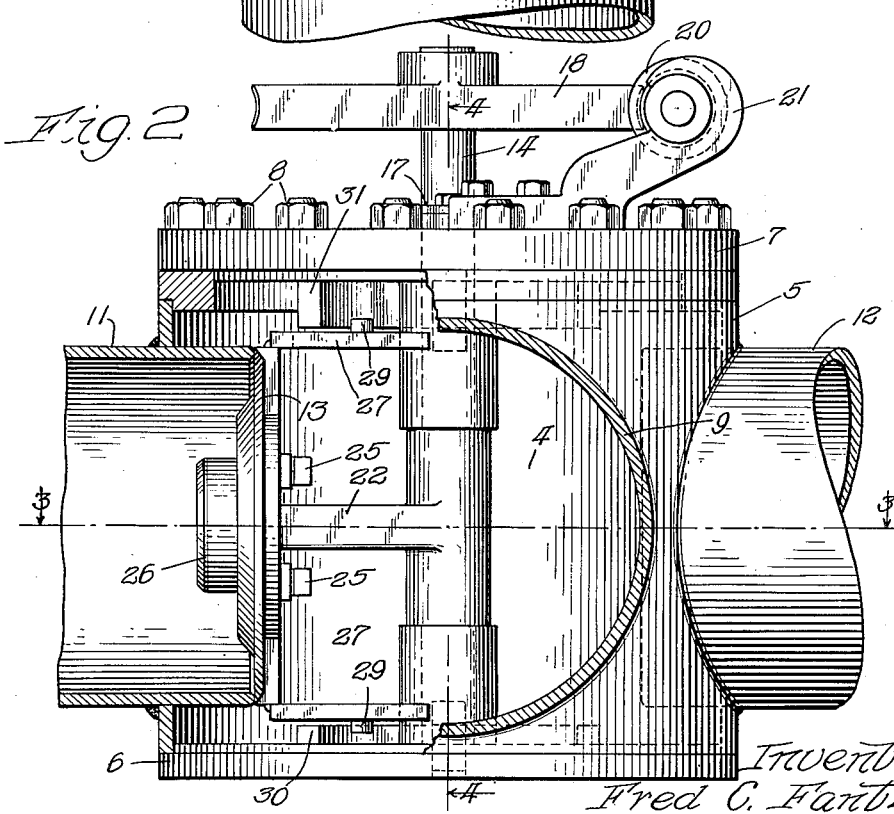

Figure 1 is a fragmentary plan view of the improved valve; Fig. 2, a fragmentary vertical sectional view of the same; Fig. 3, a fragmentary plan sectional view taken as indicated at line 3—3 of Fig. 2; and Fig. 4, a fragmentary vertical sectional view taken as indicated at line 4—4 of Fig. 2.

In the embodiment illustrated, a valve chamber 4 has a cylindrical wall 5, which is closed at the bottom by a plate 6 and at the top by a removable plate 7 secured in position by nuts 8. The valve chamber is shown provided with an inlet conduit 9, which is welded to the wall 5, as indicated at 10. The chamber is also shown provided with a pair of outlet conduits 11 and 12, which are shown diametrically opposed and extend into the valve chamber. Their inner ends afford flat seats for the valve head 13.

An operating shaft 14 is journalled in bronze bearings 16 in the plates 6 and 7 which form the end walls of the valve chamber, and extends outwardly through a stuffing box 17. A segmental worm gear 18 is keyed to the shaft 14, as indicated at 19. As shown in Figs. 1 and 2, a helical drive gear 20 is journalled in brackets 21 and may be rotated by suitable means, not shown, to oscillate the shaft 14. Inside the valve chamber, the shaft 14 is provided with a crank arm 22, whose end makes a pivotal connection with the valve head 13, by means of a wrist pin 23 which extends into a bearing block 24, which is secured in the head by means of bolts 25.

The head 13 is a disc-like member adapted to seat on the ends of the conduits 11 or 12. It has a cap portion 26, mounted in position to enclose the bearing block 24. The valve head is also provided with wing-like guide members 27, which extend rearwardly and have an inner curved face adapted to engage guide studs 28, which project inwardly from the end walls of the valve chamber. The members 27 are also provided with studs 29, which are adapted to engage inwardly extending curved guide arms 30 and 31, which are secured to the bottom plate 6 and the top plate 7, respectively. The guide members 27 and studs 29 on the valve head cooperate with the curved guide members and studs 28 on the walls of the valve chamber to direct the valve head from the plane of one valve seat to the plane of the other valve seat, when the shaft 14 is turned. This prevents the edge of the valve head from catching on the edge of either of the valve seats, as it moves into position.

It will be noted, in Fig. 3, that the shaft 14 is offset from the center line of the seats on the conduits 11 and 12. As the valve head is turned into closing position, it first swings into contact with the valve seat and then exerts a slight sliding motion as it is pressed home by the crank arm 22. This toggle-like movement enables considerable pressure to be exerted, and the pivotal mounting of the valve head enables it to accommodate itself to the valve seat.

If it is desired to have both of the conduits 11 and 12 open at the same time, the shaft 14 is turned to the mid-position, where the valve head is out of the way and will permit liquids to flow freely from the conduit 9 to each of the conduits 11 and 12.

The foregoing detailed description is given for clearness of understanding only, and no unnecessary limitations should be understood therefrom, for some modifications will be obvious to those skilled in the art.

I claim:

1. A swinging slide-valve comprising: a valve chamber having end walls and provided with a plurality of conduits opening into said chamber, two of said conduits having flat valve seats within the chamber; a shaft journalled in said end walls of the chamber and provided with a crank arm in said chamber; a valve head pivotally mounted on the end of said crank arm and having a face adapted to engage and close either of said valve seats; and interengaging guide mechanism on an end wall and said valve head to guide said valve head face from one seat to the other.

2. A device as specified in claim 1, in which the valve seats are diametrically opposed, and the shaft is offset from the center line of the valve seats.

3. A device as specified in claim 1, in which the interengaging guide mechanism includes a curved guide arm and a spaced stud extending into the chamber from an end wall, and a wing-like guide arm on the valve head adapted to engage said stud and having a guide pin adapted to engage said curved guide arm.

4. A slide-valve as claimed in claim 3, in which clearance is provided between the interengaging curved guide arm and wing-like guide arm members, pin and stud so that said wing-like guide portion moves away from said stud during final seating of the valve head against the valve seat.

5. A swinging slide-valve comprising, a valve chamber having end walls and side walls, the side walls having spaced apart valve seats, a rotatable shaft journalled in the end walls and extending through the chamber, a crank arm fixed to said shaft within the chamber, a valve head pivotally mounted on the end of the crank arm, said valve head having a curved guide portion and a guide pin, and one of the end walls having fixed thereto a curved guide arm and a spaced guide stud, whereby the curved portion of the valve head and the guide pin will engage the guide stud and the curved guide arm respectively on said end wall to direct the face of said valve head from one valve seat to the other when the shaft is turned.

6. A slide-valve as claimed in claim 5, in which said curved guide portion and guide pin are mounted on the valve head adjacent one end wall, and a similar but reversely positioned curved guide portion and guide pin are mounted on the opposite edge of the valve head adjacent the other end wall, and said other end wall is provided with a curved guide arm and a guide stud similar to those of the end wall having the curved guide arm and guide stud first mentioned.

7. A swinging slide-valve comprising, a valve chamber having end walls and side walls, a shaft journalled in said end walls and extending through the chamber, said side walls being formed with oppositely positioned conduit openings, a valve seat associated with each of said conduit openings, a crank arm fixed to said shaft within the chamber, a valve head pivotally mounted on the end of the crank arm, a guide member fixed to the valve head and extending inwardly into the chamber, said guide member having an inner curved surface, a guide stud fixed to an end wall, a curved guide arm fixed to the last mentioned end wall adjacent said guide stud, and a projection on the guide member adapted to slidably engage said curved guide arm whereby the curved surface of the guide member will engage the guide stud and the projection on the guide member will engage the curved guide arm as the shaft rotates and swing the valve head free of the side walls to reversed position from one valve seat to the other.

8. A swinging slide-valve comprising, a valve chamber having side walls and end walls and provided with a plurality of conduits opening into said chamber, the inner end of each of said conduits forming a flat valve seat within the chamber, a shaft journalled in said end walls and having a crank arm fixed thereto to rotate therewith, said crank arm being located within said chamber to swing therein, a valve head pivotally mounted on the end of the crank arm, said valve head having on its inner face a wing-like guide member formed with an inner curved face, a guide stud on one of said end walls and extending into the chamber to engage said curved face, a curved guide arm fixed to the said last mentioned end wall and spaced a slight distance laterally of said guide stud, a stud on said guide member of a length to be engageable with said curved guide arm, whereby when the shaft is rotated the guide member stud will engage the curved guide arm and the curvature of the wing-like guide member will engage the first mentioned stud to floatingly reverse the position of the valve head and move it from contact with one valve seat to contact with the other valve seat.

9. A swinging slide-valve comprising, a valve chamber having side walls and end walls, said side walls having a plurality of conduit openings and a valve seat for each conduit opening, a shaft journalled in said end walls and extending longitudinally through the chamber, a crank fixed to said shaft within the chamber, a valve head pivotally mounted on the end of the crank arm, said shaft being offset laterally of and parallel to the longitudinal center line of the chamber, and coacting guide means on the valve head and said end walls for guiding the valve head from one valve seat to the other, said valve head having swinging movement with relation to said crank while passing from one valve seat to the other whereby the valve head first swings into contact with a valve seat and then has a sliding motion as it is pressed against the valve seat by the crank arm.

FRED C. FANTZ.

REFERENCES CITED

The following references are of record in the file of this patent:

UNITED STATES PATENTS

| Number | Name | Date |
| --- | --- | --- |
| 167,751 | Earle | Sept. 14, 1875 |
| 260,490 | Martin | July 4, 1882 |
| 524,922 | Walsh | Aug. 21, 1894 |
| 845,213 | Bazin | Feb. 26, 1907 |
| 1,265,807 | Moe | May 14, 1918 |
| 1,821,992 | Stevens | Sept. 8, 1931 |
| 1,951,878 | Lundgren | Mar. 20, 1934 |
| 2,020,181 | Hayner | Nov. 5, 1935 |
| 2,028,726 | Stewart | Jan. 21, 1936 |
| 2,097,285 | Lundgren | Oct. 26, 1937 |

FOREIGN PATENTS

| Number | Country | Date |
| --- | --- | --- |
| 737,742 | France | of 1932 |